United States Patent Office 2,794,051
Patented May 28, 1957

2,794,051

BIS-CYCLOHEXADIENONES AND PROCESS THEREFOR

Robert D. Lipscomb, Deerhurst, Del., assignor to E. I. du Pont de Nemours and Company, Wilmington, Del., a corporation of Delaware No Drawing. Application September 3, 1954, Serial No. 454,207

13 Claims. (Cl. 260—586)

This invention relates to new compositions of matter and to methods for their preparation.

As shown by Pummerer et al., Ber. 85, 535 (1952), oxidation of tetrachloro-p-cresol with alkaline potassium ferricyanide at 0° C. yields an unstable ketone of the structure:

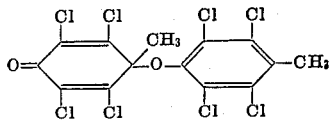

Among the decomposition products formed is the peroxide:

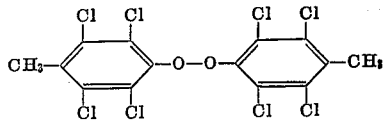

Reaction of either the ketone or peroxide with dimethyl butadiene or cyclopentadiene yields 1,4-adducts:

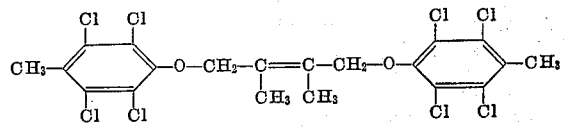

and

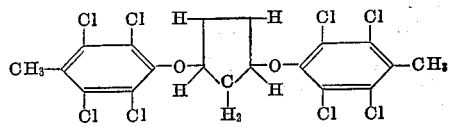

This invention has as an object the preparation of new compounds. A further object is the preparation of new motor fuel adjuvants. Another object is the preparation of intermediates. Other objects will appear hereinafter.

These objects are accomplished by the present invention of compounds of the formula:

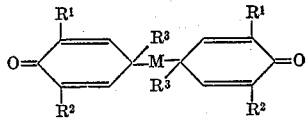

wherein M is a divalent radical containing all of the atoms of an ethylenically unsaturated compound, $R^1$ and $R^2$ are the same or different monovalent hydrocarbon radicals directly linked to the ring carbon by a tertiary carbon atom, especially tertiary alkyl radicals having a molecular weight of at least 57, and $R^3$ is a monovalent hydrocarbon radical containing no hydrogen atoms on the carbon atom adjacent to the aromatic ring carbon, or OR in which R is an alkyl radical, preferably having not more than 18 carbon atoms, or $CX_3$ in which X is chlorine or fluorine.

The present invention also comprises the method for preparing the compounds of the invention by reacting an ethylenically unsaturated compound having a molecular weight below 200 with the free radical obtained by the liquid phase oxidation of a phenol of the general formula:

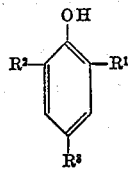

in which the R's have the previously indicated meanings.

In one method of operation a solution of the phenol is permitted to flow downwardly through a column filled with lead dioxide into a 4-neck flask fitted with a stirrer, a Dry Ice condenser, a liquid organic solvent, and an inlet tube extending below the surface of the liquid.

To the oxidation product, obtained as above, there is added the ethylenically unsaturated compound in amount at least molar equivalent to the phenol and the mixture agitated at a temperature up to 150° C., preferably from normal room temperature to 80° C. Depending upon the temperature conditions and the specific ethylenically unsaturated compound, the time of reaction may vary from several hours to a week or more. The product is isolated by distillation or other methods known to those skilled in the art.

The following examples in which parts are by weight are illustrative of the invention.

EXAMPLE I

A solution of 22 g. of 2,4,6-tri-tert.-butyl phenol in 60 ml. of benzene was passed down a column containing 110 g. of lead dioxide and collected in a 4-neck flask containing 150 ml. of benzene. The flask was fitted with a stirrer, a Dry Ice condenser, and a gas inlet tube which extended below the surface of the liquid. Butadiene-1,3 was bubbled intermittently through the reaction mixture for five days, during which time the color of the solution changed from blue to yellow. The contents of the flask were transferred to a distillation flask and evaporated at reduced pressure. The residue was a yellow solid which after recrystallization from alcohol melted at 169–171° C. and was characterized as 4,4'-(2-butenylene) - bis(2,4,6 - tri-tert.-butyl-2,5-cyclohexanedienone). The ultraviolet spectra of this product showed an absorption maximum at 2460 A. The product analyzed as follows:

*Analysis*

Calculated for $C_{40}H_{64}O_2$: C, 83.3%; H, 11.1%; M. W., 576.

Found: C, 83,12%, 83.41%; H 11.24%, 11.32%; M. W., 550, 576.

EXAMPLE II

A pressure bottle containing 20 g. of 2,4,6-tri-tert.-butyl phenol, 50 g. of lead dioxide, 30 g. of distilled butadiene-1,3 and 40 ml. of benzene was flushed with nitrogen, sealed and heated at 50° C. for 20 hours. By this time the liquid in the reaction mixture had turned from blue to yellow. Filtration of the mixture followed by evaporation of the filtrate gave 25 g. of yellow residue from which there was obtained by crystallization from ethanol 12.3 g. of a product which melted at 167–168° C. The product was identical to that of Example I.

EXAMPLE III

Example II was repeated using vinyl chloride in place of butadiene-1,3. The product obtained melted at 168–172° C., was characterized as 4,4'-(chloroethylene)bis- (2,4,6-tri-tert.-butyl-2,5-cyclohexadienone), and analyzed as follows:

Analysis

Calculated for $C_{38}H_{61}O_2Cl$: C, 77.9%; H, 10.49%; Cl, 6.05%; M. W. 585.
Found: C, 78.19%, 78.40%; H, 10.11%, 10.09%; Cl, 5.98%; M. W. 610, 640.

EXAMPLE IV

Example II was repeated, using acrylonitrile in place of butadiene-1,3. The product melted at 195.5–197° C., showed an ultraviolet absorption maximum at 2440 A., was characterized as 4,4'-(cyanoethylene)bis(2,4,6-tri-tert.-butyl-2,5-cyclohexadienone), and analyzed as follows:

Analysis

Calculated for $C_{39}H_{61}O_2N$: N, 2.44%; M. W. 575.
Found: N, 2.68%, 2.69%; M. W. 580, 585.

EXAMPLE V

Example II was repeated, using 2,4,6-tri-tert.-amyl phenol in place of 2,4,6-tri-tert.-butyl phenol. The product obtained was an oil and was characterized as 4,4'-(2-butenylene)bis(2,4,6-tri-tert.-amyl-2,5-cyclohexadienone).

EXAMPLE VI

Example II was repeated, using maleic anhydride in place of butadiene-1,3. From the reaction mixture there was isolated a product which melted at 173–174° C., showed an ultraviolet absorption maximum at 2430 A., was characterized as bis(1,3,5-tri-tert.-butyl-4-oxo-2,5-cyclohexadienyl)-succinate, and analyzed as follows:

Analysis

Calculated for $C_{40}H_{62}O_6$: C, 75.19%; H, 9.78%; M. W., 639.
Found: C, 75.18%; H, 9.50%; M. W., 602.

EXAMPLE VII

Example II was repeated, using 4-phenyl-2,6-di-tert.-butyl phenol in place of 2,4,6-tri-tert.-butyl phenol. The product melted at 169–170° C., was characterized as 4,4'-(2-butenylene)bis(2,6-di-tert.-butyl-4-phenyl-2,5-cyclohexadienone), and analyzed as follows:

Analysis

Calculated for $C_{44}H_{56}O_2$: C, 85.65%; H, 9.15%; M. W. 617.
Found: C, 85.16%; H, 9.18%; M. W. 650, 645.

EXAMPLE VIII

A mixture of 15 g. of 2,4,6-tri-tert.-butyl phenol, 47.3 g. of potassium ferricyanide, 7.2 g. of potassium hydroxide, 180 ml. of oxygen-free water, and 720 ml. of benzene was stirred for two hours in an atmosphere of nitrogen. The blue organic layer was then separated and mixed with 57 g. of freshly distilled chloro-2-butadiene-1,3. The flask was sealed under nitrogen and allowed to stand at room temperature for five days, by which time the color had changed to light yellow. Evaporation of the solvent at reduced pressure gave 17 g. of residual yellow crystals which melted at 167.5–170° C., after recrystallization from ethanol. This product was characterized as 4,4'-(2-chloro-2-butenylene)bis(2,4,6-tri-tert.-butyl-2,5-cyclohexadienone). Analysis of this product gave the following compositions:

Analysis

Calculated for $C_{40}H_{62}O_2Cl$: C, 78.80%; H, 10.22%; Cl, 5.83%; M. W. 610.
Found: C, 78.36%; H, 10.38%; Cl, 5.48%; M. W. 560, 570.

The ultraviolet absorption showed a maximum at 2440 A.

EXAMPLE IX

A solution of 15 g. of 2,4,6-tri-tert.-butyl phenol in 40 cc. of benzene was passed down a column containing a mixture of 75 g. of lead oxide and an equal volume of a filter aid into a flask fitted with a stirrer, condenser, and addition funnel. The column was flushed with 100 ml. of benzene. To this solution there was added 40 cc. of an etheral solution of 2,5-dimethylene-2,5-dihydrofuran (0.025 mole), prepared as described below, over a period of 45 minutes and the reaction mixture was then allowed to stand for 14 hours. By this time the blue color had become less intense. An additional 20 cc. of etheral solution containing 0.012 mole of 2,5-dimethylene-2,5-dihydrofuran was added over a period of 1.5 hours, by which time the reaction mixture had become yellow. Evaporation of the solvent yielded 18 g. of yellow oil which after recrystallization from acetonitrile yielded crystals which melted at 143.5–144.5° C. The product was characterized as 2,5-bis(1,3,5-tri-tert.-butyl-4-oxo-2,5-cyclohexadienylmethylene)-furan. The infrared absorption spectra of this product indicated the presence of quinone type carbonyl functions.

The 2,5-dimethylene-2,5-dihydrofuran used in the above example was prepared as follows:

An aqueous solution of 5-methyl-2-furfuryltrimethylammonium hydroxide (prepared from 11.7 parts of 5-methyl-2-furfuryltrimethylammonium bromide and 16 parts of silver oxide) was heated at a pressure ranging from about 30 mm. down to about 3 mm. of mercury at a maximum temperature of 30° C. to remove the water. The solid residue was then heated at 150° C. at 3-4 mm. pressure for a period of 20 minutes in a reaction vessel connected to a receiver cooled in a mixture of solid carbon dioxide and acetone. The product was a white solid in the cold receiver which, on warming, turned to a light yellow liquid, and was characterized as 2,5-dimethylene-2,5-dihydrofuran.

EXAMPLE X

A mixture of 0.5 g. of 4-phenyl-2,6-di-tert.-butyl phenol, 24 ml. of distilled chloro-2-butadiene-1,3, 10 ml. of petroleum ether, and 8 g. of lead dioxide was sealed in a bottle and allowed to stand for 48 hours. By this time the solution had become light yellow. Evaporation of the solvent after filtration gave 0.47 g. of yellowish oil from which there was obtained, by crystallization in ethanol, yellow crystals which melted at 179–180° C. The product was characterized as 4,4'-(2-chloro-2-butenylene)bis(2,6-di-tert.-butyl-4-phenyl-2,5-cyclohexadienone).

Analysis

Calculated for $C_{44}H_{55}O_2Cl$: C, 81.40%; H, 8.52%.
Found: C, 80.51%; H, 8.55%.

EXAMPLE XI

Example X was repeated using 2,6-ditertiary-butyl-4-methoxyphenol in place of 4-phenyl-2,6-ditertiary-butyl phenol. The product obtained was an oil which was characterized as 4,4'-(2-chloro-2-butenylene)bis-2,6-ditertiary-butyl-4-methoxy-2,5-cyclohexadienone. The product analyzed carbon, 73.4%, hydrogen, 9.35%. The calculated values for $C_{34}H_{51}O_4Cl$ are: C, 73.2%; H, 9.20%.

The phenols used in the practice of this invention are those which are hindered with respect to hydrogen bonding [Sears et al., J. Am. Chem. Soc. 71 4110–12 (1949)], are insoluble in aqueous alkali, and fail to give the customary coloration with aqueous or alcoholic ferric chloride solutions. They are further characterized by showing a hydroxyl group wave band shift in the infrared of less than 0.01 μ when measured in dilute and in concentrated solutions according to the procedure described by Sears et al. These phenols are substituted in the positions 2, 4, and 6 with respect to the hydroxyl group. The two substituents ortho to the hydroxyl group contain a tertiary carbon atom directly linked to the benzenoid ring carbons, and have molecular weights of at least 57, and the substituent para to the hydroxyl group may be the same or different from that in the ortho positions but must be free of hydrogen on the carbon atom directly attached to the benzenoid ring carbon. Thus, the invention is generic to phenols having in the two positions ortho to the phenolic hydroxyl a monovalent hydrocarbon radical in which the carbon atom joined to the ring carbon has all of its valences satisfied by carbon atoms only and having in the para position a monovalent hydrocarbon group free from non-aromatic unsaturation and which is joined to the ring carbon by a carbon which has all of its valences satisfied by carbon atoms. Instead of this last hydrocarbon radical, there may be an alkoxy group, RO, or a perhalomethyl group wherein the halogen is of atomic number no higher than 17. Thus, the invention includes the employment of these phenols in general, including 2,6-di-tert.-butyl-4-methoxy-phenol, 2,6-di-tert.-butyl-4-diisobutylphenol, 2,6-di-tert.-amyl-4-phenylphenol, 2,6-di-(1,1-dimethylbutyl)-4-methoxyphenol, 2,4,6-tri-tert.-amylphenol, 2-6-di-tert.-butyl-4-trichloromethylphenol, 2,6-di-tert.-amyl-4-trifluoromethylphenol, and the like. Particularly preferred are the 2,4,6-tri-tert.-alkyl phenols.

The oxidation step leading to the formation of the free radical is conveniently effected at room temperature with a solid, metal-containing oxidizing agent, e. g., potassium ferricyanide, potassium permanganate, lead dioxide, manganese dioxide, osmium tetroxide, etc. Of these, lead dioxide is a preferred oxidizing agent because of its availability, effectiveness, and simplicity of use. A convenient and effective way of operating with lead dioxide is by permitting the phenol to trickle through a column packed with lead dioxide.

The oxidation with potassium ferricyanide is conducted under alkaline conditions, i. e., under conditions which provide a pH of from 8 to 10.

The oxidation product obtained as above is reacted with the ethylenically unsaturated compound at temperatures up to 150° C., preferably from ordinary room temperature to 80° C. A convenient way of conducting the reaction is to mix the oxidation product and ethylenically unsaturated compound in a closed reactor and permit the mixture to stand with agitation until there is a color change in the reaction mixture. This may require up to a week or more, depending upon the temperature conditions used and the particular reactants involved.

The amount of ethylenically unsaturated compound used is at least molar equivalent to the phenol oxidized. If desired, a larger amount may be used but amounts substantially in excess of two moles of ethylenically unsaturated compound per mole of phenol lead to no practical advantages but rather add to costs and purification problems and hence are not generally employed.

Suitable solvents for effecting the oxidation of the phenol are benzene, petroleum ether, diethyl ether, etc.

The concentration of the phenol in the solution may vary from 5 to 20% by weight.

Any ethylenically unsaturated compound having a molecular weight below 200 may be used in the process of this invention, including butadiene, 2,3-dimethylbutadiene-1,3, cyclopentadiene, 2-chlorobutadiene-1,3, 2-methylbutadiene-1,3, acrylonitrile, methacrylonitrile, crotonitrile, 2,5-dimethylene-2,5-dihydrofuran, styrene, isobutylene, ethylene, propylene, maleonitrile, methyl acrylate, methyl methacrylate, vinyl chloride, vinyl fluoride, vinyl acetate, 2,2-difluoro-1-chloroethylene, vinylidene chloride, maleic anhydride, allyl alcohol, and the like. Particularly preferred are the addition polymerizable olefinic compounds and especially those which are hydrocarbon and of at least four carbons.

The products of this invention show maximum absorption in the ultraviolet in the region of 2300 to 2500 A. According to Bickel and Kooyman, J. Chem. Soc. 1953, 3217, and Cook and Woodworth, J. Am. Chem. Soc. 75, 6242 (1953), the 4-substituted cyclohexadienones have absorption maxima in the above indicated region and the 2-substituted cyclohexadienones in the 3100 A. region. Thus, the ultraviolet absorption characteristics of the products of this invention fall in the region typical of the 4-substituted cyclohexadienones. Infrared analyses of the products of this invention show no aryloxy bands and do show bands typical of quinone type carbonyl groups giving further support to the structure assigned, namely, 4-substituted cyclohexadienones.

The products of this invention, by virtue of having two cyclohexadienone residues are useful anti-oxidants, biological and agricultural chemical intermediates. They are also effective as ignition accelerator additives in hydrocarbon fuels for diesel engines, as shown below.

Five cc. of 4,4'-(2-butenylene)-bis-2,4,6-tri-tert.-butyl-2,5-cyclohexadienone was dissolved in 684 cc. of n-heptane and the mixed fuel was tested for ignition performance as follows:

An ignition chamber consisting of a stainless steel cylinder having a 2" x 7" bore was wound with an insulated resistance heating element drawing five amperes at about 170 volts. The wall of the chamber was drilled with a thermocouple well, and temperature control was provided with a suitable controller-recorder. One end of the ignition chamber was fitted with a steel cap to which was threaded a 0.25" stainless steel nipple connecting it to a piston. The piston operated in a vertical position, rising and making electrical contact when pressure decreased rapidly through the vents in the system. The butt end of the ignition chamber was drilled to carry an 8 mm. glass tube by a slip fit. This tube, through which the fuel was injected, was a 1 mm. capillary T-tube, one end of which was inserted in the furnace and the other end was connected to a low-pressure air line through a solenoid valve.

The fuel was injected into the side arm by means of a micropipette and allowed to run into a catenary depression in the tube blowing it into the combustion chamber. The micropipette was calibrated in hundredths of a cc. and the end was fitted with a hypodermic needle.

Time of delay between injection of the fuel into the combustion chamber and its autoignition was recorded on a suitable oscillograph recorder operated on 60 cycle alternating current, so that the time was recorded in units of a sixtieth of a second.

In making a run, the fuel (0.04 ml.) was injected into the capillary and the side arm closed. The oscillograph recorder was then turned on and the circuit closed. This activated the solenoid valve and fuel was injected into the combustion chamber, simultaneously starting the recording paper traversing the timer. When the pressure in the chamber changed, as a result of ignition, the piston momentarily closed another circuit, which caused a characteristic deviation in the oscillograph record. After firing the ignition chamber was cleared by blowing a rapid stream of air through it for thirty seconds.

Under the above test the fuel containing the 4,4'-(2-butenylene)-bis-2,4,6-tri-tert.-butyl-2,5-cyclohexadienone had a rating of $32/60$ second while the n-heptane control had a rating of $35/60$ second. This test clearly indicates that the additive functioned as an ignition accelerator.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. A bis-cyclohexadienone of the formula:

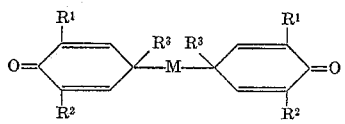

wherein M is a divalent radical corresponding in atomic content to one molecule of an ethylenically unsaturated compound of molecular weight not more than 200, $R^1$ and $R^2$ are tertiary monovalent hydrocarbon radicals, and $R^3$ is selected from the group consisting of hydrocarbon radicals free of hydrogen on the carbon directly bonded to the ring carbon, alkoxy, and $CX_3$ wherein X is a halogen of atomic number no higher than 17.

2. A bis-cyclohexadienone of the formula:

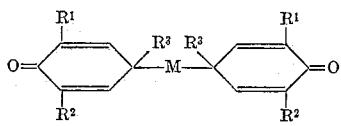

$R^1$ and $R^2$ are each an alkyl radical with their free valence stemming from carbon joined only to carbon, $R^1$ may be different from $R^2$, and $R^3$ is a radical selected from the class consisting of aryl radicals, alkoxy radicals, perfluoromethyl radicals, perchloromethyl radicals, and alkyl radicals with their free valence stemming from carbon joined only to carbon, and M corresponds in atomic content to one molecule of an ethylenically unsaturated compound of molecular weight not more than 200.

3. A bis-cyclohexadienone wherein the two cyclohexadienone radicals are joined from carbon para to the oxo carbon and through a divalent radical corresponding in atomic content to an ethylenically unsaturated compound of molecular weight not more than 200, said divalent radical having its valences stemming from different carbons which carbons, in the unsaturated compound, are doubly bonded, said cyclohexadienone radicals having each of the two carbons ortho to the oxo oxygen bonded to carbon, itself bonded only to carbon of a monovalent hydrocarbon radical, the carbon para to the oxo carbon being bonded not only to said radical corresponding to the unsaturated compound but also to carbon, bonded only to carbon, of a hydrocarbon radical free from non-aromatic unsaturation.

4. A bis-cyclohexadienone wherein the two cyclohexadienone radicals are joined from carbon para to the oxo carbon and through a divalent radical corresponding in atomic content to a peroxy catalyst polymerizable olefinic compound of molecular weight not more than 200, said divalent cyclohexadienone radicals having their ortho and para carbon atoms directly attached to the tertiary carbon atom of a tertiary alkyl radical.

5. A bis-cyclohexadienone wherein the two cyclohexadienone radicals are joined from carbon para to the oxo carbon and through a $-CH_2-CH=CH-CH_2-$ radical, said cyclohexadienone radicals having each of the three radicals in the ortho and para positions to the oxo oxygen bonded to carbon, bonded only to carbon, of an alkyl radical.

6. A bis-cyclohexadienone wherein the two cyclohexadienone radicals are joined from carbon para to the oxo carbon through a divalent radical having the atomic composition and carbon skeleton of a hydrocarbon olefine of at least four carbons and of molecular weight not more than 200, said radicals each having its valences stemming from different carbons which are doubly bonded in the olefine, said cyclohexadienone radicals having, as the only substituents other than those given, three tertiary alkyl radicals in the ortho and para positions to the oxo carbon.

7. A bis-cyclohexadienone wherein the two cyclohexadienone radicals are joined from carbon para to the oxo carbon through a divalent radical having the atomic composition and carbon skeleton of an addition polymerizable olefinic compound of molecular weight not more than 200, said radicals each having its valences stemming from different carbons which are doubly bonded in the olefinic compound, said cyclohexadienone radicals having, as the only substituents other than those given, three hydrocarbon radicals in the ortho and para positions to the oxo carbon, said hydrocarbon radicals each having its free valence stemming from carbon joined only to carbon.

8. The process which comprises bringing into contact with an oxidizing agent a phenol hindered in all three of the ortho and para positions and reacting the cyclohexadienone free radical thus obtained with an olefinic compound of molecular weight not more than 200.

9. The process which comprises bringing into contact with an oxidizing agent a phenol having as its only substituents three tertiary alkyl groups and these in the ortho and para positions and reacting the cyclohexadienone free radical thus obtained with an addition polymerizable olefinic compound of molecular weight not more than 200.

10. The process which comprises bringing into contact with an oxidizing agent a phenol having as its only substituents three tertiary alkyl groups and these in the ortho and para positions and reacting the cyclohexadienone free radical thus obtained with an addition polymerizable olefinic hydrocarbon of molecular weight not more than 200.

11. Process which comprises bringing into contact with an oxidizing agent a phenol having on each of the ortho positions an alkyl group bonded to the benzenoid ring carbon by a carbon whose remaining valences are satisfied by carbon atoms only and having on the para position a radical of the class of hydrocarbon radicals free of aliphatic unsaturation and bonded to the benzenoid ring carbon by a carbon bonded only to carbon, alkoxy, and $CX_3$, in which X is a halogen of atomic number no higher than 17, and reacting the cyclohexadienone free radical thus obtained with an ethylenically unsaturated compound having a molecular weight less than 200.

12. Process which comprises bringing into contact with an oxidizing agent a phenol having on each of the ortho positions an alkyl group bonded to the benzenoid ring carbon by a carbon whose remaining valences are satisfied by carbon atoms only and having on the para position a radical of the class consisting of hydrocarbon radicals free of aliphatic unsaturation and bonded to the benzenoid ring carbon by a carbon bonded only to carbon, alkoxy, and $CX_3$, wherein X is a halogen of atomic number no higher than 17 and reacting the cyclohexadienone free radical thus obtained with butadiene.

13. Process which comprises bringing into contact with lead dioxide a phenol having on each of the ortho positions an alkyl group bonded to the benzenoid ring carbon by a carbon bonded only to carbon and having on the para position a hydrocarbon radical free of aliphatic unsaturation and bonded to the benzenoid ring carbon from carbon bonded only to carbon and reacting the cyclohexadienone free radical thus obtained with butadiene.

References Cited in the file of this patent

UNITED STATES PATENTS

| | | |
|---|---|---|
| 2,097,854 | Dilthey | Nov. 2, 1937 |
| 2,392,864 | Schoeller et al. | Jan. 15, 1946 |

OTHER REFERENCES

Cook et al.; J. A. C. S. 75 (Dec. 20, 1953), p. 6242 (rec'd., August 1953).